United States Patent [19]

Wiegand

[11] 4,398,196
[45] Aug. 9, 1983

[54] INSTANTANEOUS BROADBAND RADAR SIGNAL PULSE DETECTOR

[75] Inventor: Richard J. Wiegand, Severna Park, Md.

[73] Assignee: Westinghouse Electric Corp., Pittsburgh, Pa.

[21] Appl. No.: 246,501

[22] Filed: Mar. 23, 1981

[51] Int. Cl.³ .............................................. G01S 7/28
[52] U.S. Cl. ........................... 343/17.1 R; 343/5 SA; 343/18 E
[58] Field of Search .............. 343/5 SA, 17.1 R, 18 E

[56] References Cited

U.S. PATENT DOCUMENTS

| 4,017,856 | 4/1977 | Wiegund | 343/18 E |
| 4,145,691 | 3/1979 | Freeling et al. | 343/18 E X |
| 4,188,628 | 2/1980 | Langeraar et al. | 343/5 SA |
| 4,315,261 | 2/1982 | Mosher | 343/18 E |

Primary Examiner—T. H. Tubbesing
Attorney, Agent, or Firm—W. E. Zitelli

[57] ABSTRACT

A pulse detection radar signal receiver is disclosed which includes at least one pulse detection channel that has an RF amplifier and a feedback signal path coupling the output to the input thereof for recirculation of signals therethrough. The feedback path includes a signal-to-noise (S/N) enhancer circuit and an inhibiting means, preferably disposed in series therewith. The S/N enhancer circuit is operative to adaptively focus a narrow enhancement bandwidth about the frequency of an input signal, which has a power level greater than a predetermined threshold level, for enhancing signals which have frequencies within said enhancement bandwidth and for attenuating signals which have frequencies outside said enhancement bandwidth. The enhanced and attenuated signals are provided to the input of the RF amplifier for recirculation therethrough. Thus, after one or more recirculations through the loop, an RF pulse signal, which is substantially at one carrier frequency, may be amplified and the RF noise signals, which are broadband in nature, may be attenuated. Accordingly, a weak RF pulse signal, after a number of recirculations, may become distinguishable from the broadband RF noise signals. When the RF pulse signal is detected, the inhibiting means is operated to squelch the circulated signals, momentarily, from passing through the feedback path.

9 Claims, 7 Drawing Figures (BACKGROUND)

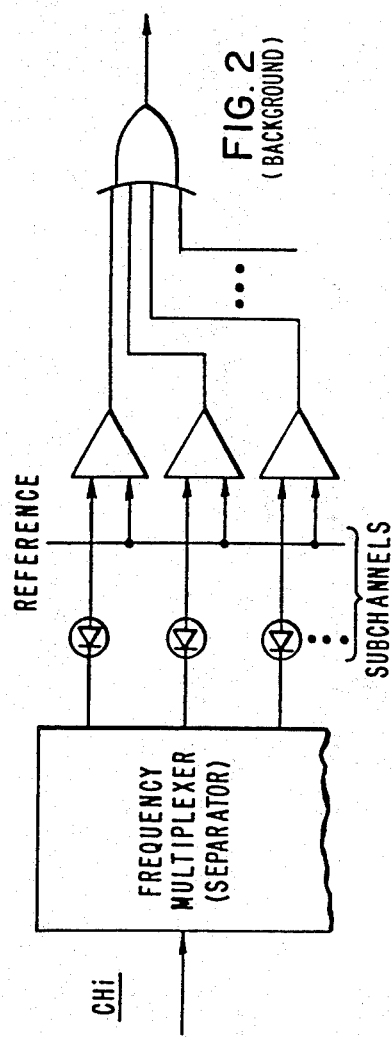
FIG. 2 (BACKGROUND)
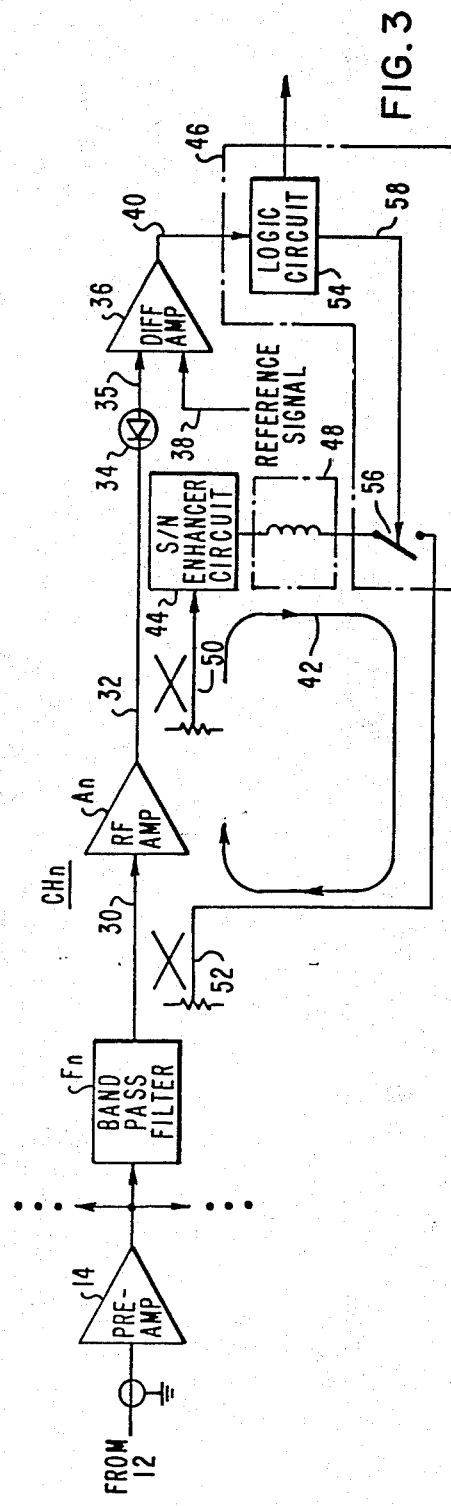
FIG. 3

INSTANTANEOUS BROADBAND RADAR SIGNAL PULSE DETECTOR

BACKGROUND OF THE INVENTION

The present invention relates to radar signal receivers, in general, and more particularly, to the detection of pulsed radar signals instantaneously over a wide microwave bandwidth, even under the conditions of low false alarm rate requirements the detected pulses especially including those which may be signal levels normally hard to distinguish from the broadband thermal or shot noise, for example, naturally generated by the receiver components.

Some airborne, shipborne or vehicle-borne systems include receivers which are designed to detect pulsed microwave carrier frequency signals in the form of pulse trains or the like that may have been transmitted by one or more radar signal sources. Since the carrier frequency of the transmitting radar is generally not known by the receiving detector and may normally range within a broadband of frequencies, say 2–20 GHz, for example, the detection frequency range of these receivers must be set commensurately wideband in order to detect substantially all such microwave transmissions. However, when pulse detecting across a broadband frequency range in a receiver, there is always the problem of distinguishing electrical signal from electrical noise, like broadband thermal or shot noise, for example, which is naturally generated within the receiver by the various signal amplifying and processing components thereof. That is, the signal level of the receiver noise, while being relatively insignificant at any one frequency, may become comparable to and indistinguishable from the signal level of a weak reception pulse when accumulated over a wideband of frequencies like the broadband detection frequency range or a portion thereof.

Radar signal receivers of the superheterodyne tunable variety have improved the sensitivity of the receiver with regard to weak pulse signal detection in the presence of receiver generated noise by search sweeping across the wideband detection frequency range, approximately 20 GHz, with a narrow tunable frequency band which may be on the order of 10–20 MHz, for example, In these receivers, the noise signal level is accumulated substantially only over the instantaneous bandwidth for any given instant in the pulse detection search sweep, thus reducing the noise signal level by orders of magnitude. Unfortunately, it does require quite a long time to search sweep across the entire detection bandwidth and since this process is one of time sharing, the possibility of radar pulses passing undetected is increased significantly. In other words, the tunable narrow band receivers do not have the characteristics of "instantaneously" broadband detection which may be more than just desirable in some applications.

Another type of radar signal receiver separates the overall broadband frequency detection range into processing channels of predetermined frequency bands on the order of 1-2 GHz each. Each channel processes received signals having carrier frequencies within the channel detection bandwidth. In this arrangement, the detection channels operate concurrently to achieve instantaneous wide bandwidth pulse detection. A typical radar signal receiver of this type may appear as that shown by the schematic block diagram embodiment of FIG. 1.

Referring to FIG. 1, radar energy 10 may be received within the beam of a conventional antenna 12, thereafter amplified by a pre-amplifier 14, and conducted to a frequency band channel separator 6. Within the separator 16, the received signals may be separated according to frequency by a plurality of band pass filters F1, F2, ... FN and correspondingly amplified by respectively associated RF amplifiers A1, A2, ..., AN. Signals S1, S2, ..., SN may exit their corresponding RF amplifiers to be processed by appropriate downstream apparatus of the receiver. In addition, a plurality of microwave couplers C1, C2, ..., CN may be connected respectively to the outputs of the amplifiers A1, A2, ..., AN to couple signals representative of S1, S2, ..., SN to corresponding detection channels CH1, CH2, ..., CHN.

In a typical channel, such as that shown in CH1, for example, the RF signal coupled thereto may be converted to a signal representative of the video frequency content thereof by a conventional crystal detector 18 and in some cases, the video signal content may be amplified by a video amplifier 20. Thereafter, the video signal may be compared with a predetermined reference signal 22 in a differential amplifier 24, for example, and a logic level effected in accordance with the outcome of the comparison. For example, if the video signal is greater than the reference, a logical one may be rendered by the amplifier 24 over signal line 26; otherwise the signal line 26 may remain at a voltage potential representative of logical zero. The output logic signals, like 26, for example, are indicative of a pulse detection in the frequency range of the detection channel or indicative of a false alarm as a result of the accumulated noise over the frequency band of the channel exceeding the reference level 22.

In order to detect pulses instantaneously across the overall wideband of microwave frequencies, which may be approximately 20 GHz, the logical outputs of the detector channels CH1, CH2, ... CHN are normally "OR"-ed. This also unfortunately results in an accumulation of the false alarms of all of the channels. If the false alarm rate of the receiver is set at 10 and there are 10 channels, for example, then the reference signal 22 of each channel CHi is generally set high enough so that a false alarm rate of no more than 1 is rendered by each channel. In so doing, the channel's detection sensitivity to received radar pulse information is greatly reduced. Consequently, some of the pulses may pass undetected because of the setting of the reference signal due to false alarm rate requirements.

The simple configuration shown in FIG. 1 is generally adequate for detecting main beam reception pulses; however, it may be of appreciable importance at times to track a pulse train or predict the time of arrival of a next pulse subsequent to the main beam pass of the radar, that is, in the sidelobes where the reception pulses are much weaker. One method for improving the sensitivity of the receiver to detect these weak sidelobe reception pulses propses to multiplex-filter the channel frequency bands into numerous frequency band subchannels, each subchannel with its own crystal detector and differential amplifiers are shown for a typical channel CHi in the functional embodiment depicted in FIG. 2. This, in principal, is expected to give the desired additional improvement in sensitivity, but at a considerable extra cost and size using well known hardware implementation techniques. While each subchannel apparently enjoys a reduction in noise level because of the reduced search bandwidth, the full additional improvement in sensitivity expected may not be completely realized because each channel must allow for false alarms from any subchannel (i.e., "OR"-ring of subchannel output) as has been explained supra.

It is evident, from the above discussions, that an improved sensitivity for an instantaneous broadband pulse detection receiver is needed for weak pulse detection under certain false alarm rate requirements. Additionally, it would be desirable if the instantaneous pulse detection system could achieve the effective noise bandwidth reduction for signal sensitivity without the necessity of a large number of duplicate components in its implementation and without a significant cost penalty.

SUMMARY OF THE INVENTION

A radar signal receiver which includes at least one pulse detection channel is operative to process received radar signals having carrier frequencies within a predetermined broadband microwave channel frequency range to detect the presence of a radar pulse. Each pulse detection channel comprises an RF amplifier for amplifying the received RF signals and a means for detecting a radar pulse from the amplified RF signals and for generating a pulse detection signal in response to the detection. In accordance with the present invention, additional apparatus is included in said at least one channel for increasing the sensitivity of detection of radar pulses especially in the presence of noise signals distributed within the corresponding broadband channel frequency detection range.

More specifically, the apparatus includes a feedback signal path which couples the output of the RF amplifier to the input thereof; and a signal-to-noise (S/N) enhancer circuit and an inhibiting means, both disposed, preferably in series, in the feedback signal path. The S/N enhancer circuit is operative to adaptively focus a narrow enhancement bandwidth about the frequency of an input signal, which has a power level greater than a predetermined threshold level, for enhancing signals which have frequencies within said enhancement bandwidth and for attenuating signals which have frequencies outside said enhancement bandwidth. The enhanced and attenuated signals are provided to the input of the RF amplifier for recirculation therethrough. Thus, after one or more recirculations through the loop, an RF pulse signal, which is substantially at one carrier frequency, may be amplified and the RF noise signals, which are broadband in nature, may be attenuated. Accordingly, a weak RF pulse signal, after a number of recirculations, may become distinguishable from the broadband RF noise signals.

In the preferred embodiment, the detecting means of each channel includes means for extracting the video content from the amplified RF signals to generate a video signal representative thereof, and a differential amplifier for comparing the video signal to a reference signal and for generating a pulse detection signal when the video signal exceeds the reference signal in value. In one aspect of the invention, the reference signal may be set at a value substantially close to, but less than, the value of the generated video signal corresponding to RF amplifier saturation. Consequently, initial weak RF pulse signals or broadband channel noise may not render a comparison condition in the differential amplifier which causes generation of a pulse detection signal. However, after the RF pulse signal is recirculated through the S/N enhancer circuit a number of times, it may become enhanced substantially to the point of saturating the RF amplifier which provides a comparison condition in the differential amplifier for the generation of a pulse detection signal.

Another aspect of the present invention provides for the inhibiting means of the feedback signal path to squelch the recirculation of the signals in the feedback path in response to the generation of a pulse detection signal.

A further aspect of the invention includes a delay means in the feedback path in series with the S/N enhancer circuit to render a recirculation loop signal delay which is greater than the reciprocal of the narrow enhancement bandwidth of the S/N enhancer circuit.

BRIEF DESCRIPTION OF THE DRAWINGS

FIG. 2 is a functional block diagram schematic of a proposed embodiment of a processing channel, having a number of frequency band subchannels, suitable for use in the radar receiver embodiment of FIG. 1;

FIG. 3 is a block diagram schematic of a pulse detection radar signal receiver suitable for embodying the principles of the present invention;

DESCRIPTION OF THE PREFERRED EMBODIMENTS

Figure 1:
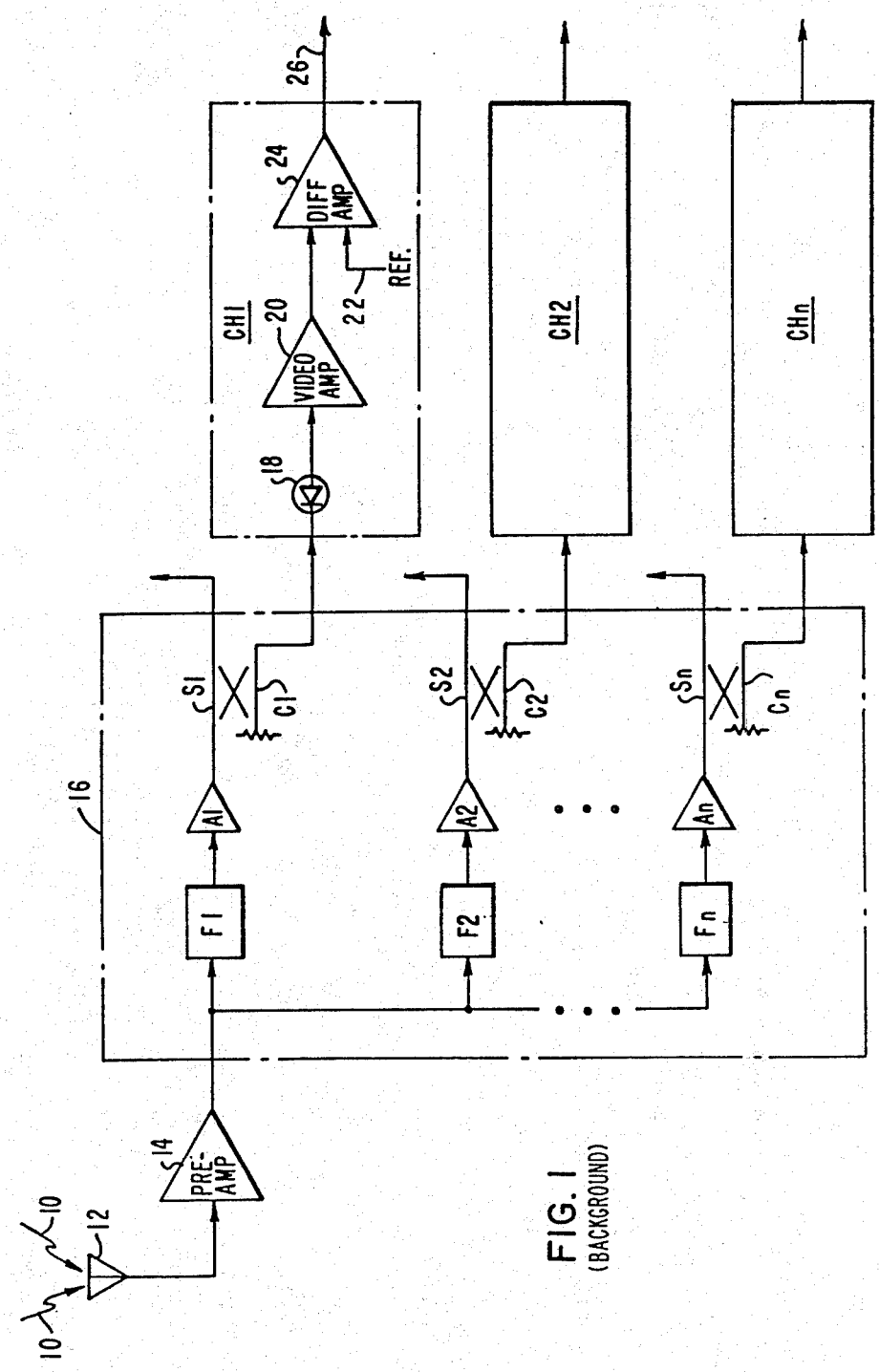
FIG. 1 is a block diagram schematic depicting an embodiment of a pulse detection radar signal receiver which separates the overall broadband frequency detection range into processing channels of predetermined frequency bands.

The embodiment of FIG. 3 depicts a radar signal receiver including at least one pulse detection channel CHn which is operative to process received radar signals having carrier frequencies within a predetermined broadband microwave channel frequency range to detect the presence of a radar pulse. The typical channel may include a bandpass filter Fn which sets the frequency range of the channel, and an RF amplifier An having an input 30 and an output 32 and being operative to amplify the received RF signals passed by the filter Fn. Also included in this typical channel CHn is a means for detecting a radar pulse from the amplified RF signals of the amplifier An and for generating a pulse detection signal in response to the detection. In the present embodiment, a crystal detector 34 is provided for extracting the video content from the amplified RF signals conducted thereto over line 32 to generate a video signal having a value representative thereof. The video signal may be provided to one input of a differential amplifier 36 over a signal line 35. The other input to the amplifier 36 may be coupled to a reference signal 38. Accordingly, the differential amplifier 36 may generate a pulse detection signal over signal line 40 as a result of the comparison between the video and reference signals supplied to its inputs.

In accordance with the present invention, improvement apparatus may be additionally disposed in the typical channel CHn for increasing the sensitivity of detection of radar pulses especially in the presence of noise conditions distributed within the corresponding broadband channel frequency detection range. More specifically, the improvement apparatus may include a feedback signal path 42 which couples the output 32 to the input 30 of the RF amplifier An. A signal-to-noise (S/N) enhancer circuit 44 may be disposed in the signal path 42 for enhancing a signal within a selectivity or enhancement bandwidth which has a bandwidth power greater than a predetermined threshold power level and for attenuating the other signals of the channel bandwidth outside of the selectivity bandwidth. The enhanced and attenuated signals may be coupled to the input of the RF amplifier An for recirculation therethrough.

Also included in the feedback signal path 42 is a means 46 for inhibiting, at times, the recirculation of the signals through the path 42 as governed by the pulse detection signal 40. Further include in the feedback signal path 42 may be a loop delay means 48 connected in series with the S/N enhancer circuit 44 to render a recirculation loop signal delay which may be greater than the reciprocal of the selectivity bandwidth of the enhancer circuit 44. Moreover, conventional microwave couplers 50 and 52 may also be disposed about the RF amplifier An for coupling the output signal from the output line 32 to the feedback signal path 42 and to couple the recirculating signals from the path 42 to the input line 30, respectively.

The signal inhibiting means 46 of the path 42 may preferably include a logic circuit 54 which may be a monostable multivibrator, for example, and a conventional microwave switch 56. The logic circuit 54 may be governed by the pulse detection signal from line 40 to generate a control signal over signal line 58 which may be coupled to the microwave switch 56 for operation thereof.

Figure 4A:
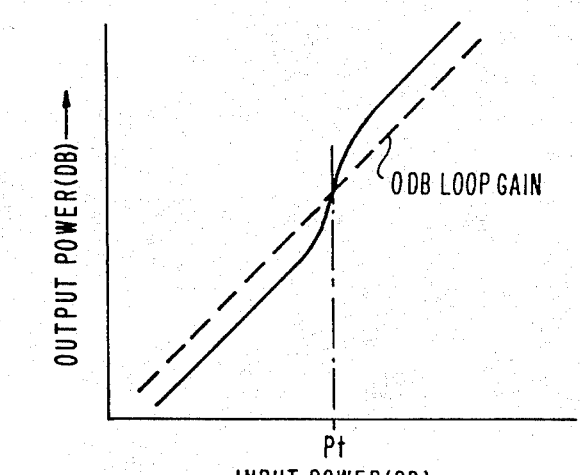
FIGS. 4A and 4B are graphs depicting typical transfer function characteristics of the S/N enhancer circuit which is used in the embodiment schematically depicted in FIG. 3.
Figure 4B:
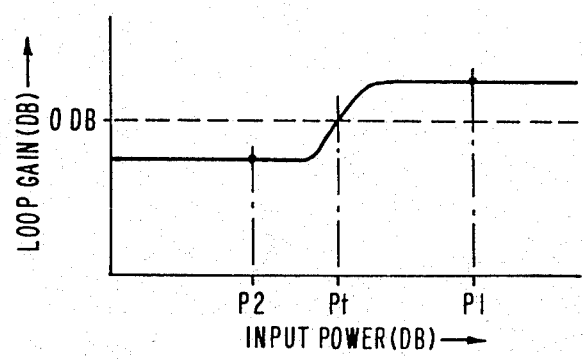

Typical examples of the two port operational characteristics of the S/N enhancer 44 are shown in the graphs of FIGS. 4A and 4B. The threshold power by which point the operation of the enhancer 44 has become nonlinear, is denoted as $P_t$ in each of the figures. In the examples shown, the enhancer 44 renders a recirculation loop gain of less than 0 db for the signal portions which have power levels less than the threshold power $P_t$ and renders a recirculation loop gain of greater than 0 db for those signal portions which exhibit power levels which are greater than the threshold $P_t$. However, this transfer function by itself is insufficient to meet the goals of the improved apparatus as described in connection with the embodiment of FIG. 3. A more important characteristic of the S/N enhancer circuit 44 is that it enhances signals on a frequency selective basis, the selectivity bandwidth, Bs, being typically on the order of 5 to 10 megahertz, for example. With these properties, the S/N enhancer 44 may adaptively focus its enhancement (low attenuation) or selectivity bandwidth, Bs, about the frequency of a strong input signal which has a power level greater than the predetermined threshold $P_t$, while frequency components outside the bandwidth Bs experience a much greater attenuation. For a more detailed understanding of a typical S/N enhancer of this type, reference is herein made to the U.S. patent application Ser. No. 061,537, filed July 27, 1979 by J. D. Adam and entitled, "Magnetostatic Wave S/N Enhancer", now U.S. Pat. No. 4,283,692, issued Aug. 11, 1981.

Figure 5:
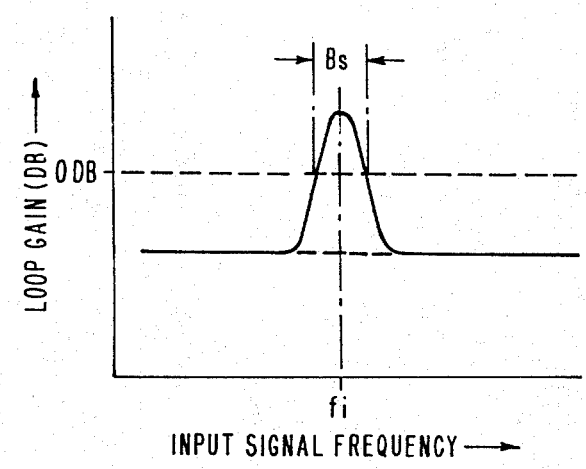
FIG. 5 is a graph illustrating the focusing of a narrow enhancement bandwidth about the frequency $f_i$ of an input signal, having a power level greater than the predetermined threshold level, by the enhancer circuit in the embodiment of FIG. 3.

Thus, with the S/N enhancer 44 in the feedback path 42, the low attenuation state offered within the selectivity bandwidth Bs produces a higher than 0 db loop gain about the amplifier An and conversely, the higher attenuation state produces a loop gain of significantly less than 0 db for frequencies outside of the bandwidth Bs. These properties are graphically illustrated in FIG. 5. For example, if an input signal has a frequency $f_i$ and a power level of say P1, which is greater than the threshold power $P_t$ as shown in FIG. 4B, then the selectivity bandwidth is focused about the frequency $f_i$ and the loop gain operating on signals therein is made greater than 0 db as depicted by the solid line in the graph of FIG. 5. However, if the power level of the input signal of frequency $f_i$ is less than $P_t$ say at P2, for example (see FIG. 4B), then the loop gain remains below 0 db as depicted by the dashed line at $f_i$ in the graph of FIG. 5.

In a typical operation of the at least one channel CHn, the reference signal 38 supplied to the differential amplifier 36 may be initially set at a value substantially close to the value of the video signal generated by the crystal diode 34 corresponding to the RF amplifier an saturation point. Keeping in mind that during the time that the receiver is waiting for a reception pulse, the receiver components are continuously generating broadband noise signals. During this waiting period, the S/N enhancer circuit 44 attenuates or keeps all broadband frequency components below a 0 db circulation loop gain. Thus as the noise signals are recriculated back through the RF amplifier An, they become weaker and weaker with each circulation.

When a pulse is passed by the filter Fn and enters the detection channel CHn, it is amplified by the amplifier An and coupled into the feedback signal path 42 through the microwave coupler 50. The S/N enhancer circuit 44 renders a recirculation loop gain of greater than 0 db for this pulse signal and less than 0 db for the noise content (see FIG. 5). Thus, as the signal recirculates around the feedback signal path 42 and through the RF amplifier An, the pulse energy rapidly becomes stronger with each circulation while at the same time the broadband noise content becomes weaker. The microwave energy continues to be circulated through the RF amplifier An by the feedback path 42 until such time as when the amplifier saturates.

Because of the setting of the reference signal 38, the saturation condition of the amplifier An is sufficient to trip the differential amplifier 36 and provide a pulse detection signal over line 40. The logic circuit 54, which may be a multivibrator circuit, for example, responds to the pulse generation signal over line 40 to generate a control signal over line 58 to open the microwave switch 56 and squelch the recirculation of the signal recirculating through the feedback signal loop 42. After a sufficient period of time, the logic circuit 54 may reset the control signal over line 58, which in turn resets the microwave switch 56 to a closed position. The feedback signal path of this condition is in a state to wait for the next pulse, or to indicate the continued presence of the same signal.

Note that the present embodiment allows the reference signal 38 to be set quite high, so that the video thermal noise as detected by the crystal detector 34 may be generally ignored by the differential amplifier 36. The embodiment as described in connection with FIG. 3 thus may have a very wide instantaneous bandwidth, but the effective noise bandwidth is set by the selectively bandwidth Bs of the S/N enhancers 44.

Considering another aspect, the actual sensitivity of a channeled detection system is normally derated to take into account the fact that a false alarm on any one equivalent subchannel represents a false alarm for the whole detection system. Likewise, in the present embodiment, the sensitivity is determined by the signal plus noise energy within a large number of selectivity bandwidths.

The following sample calculations may demonstrate the improvement in pulse detection sensitivity of the present embodiment as compared to those which have been previously proposed. It should be pointed out that a number of factors that may influence the final sensitivity of a channeled pulse detection system are not included in the following sample calculation. For that matter, it is advised to treat the following as an estimate useful only to get an approximation for the magnitude of the improvement in sensitivity.

In computing the sensitivity of the pulse detection system certain terms and symbols must be defined. For this purpose, the following glossary of symbols and terms are provided:

K = Boltzmann's constant
T = absolute temperature
$B_e$ = effective bandwidth
F = noise figure (often primarily that of the preamplifier 14)
$\theta$ = the additional S/N ratio required because of the number of channels OR'ed together
(S/N) = signal-to-noise ratio needed for a given false alarm rate and probability of detection
S = minimum signal sensitivity;
$B_V$ = video bandwidth
$B_R$ = microwave bandwidth
I = improvement in sensitivity resulting from the disclosed embodiment
$B_S$ = S/N enhancer selectively bandwidth The sensitivity of the system may be approximated by the following equation:

$$S = KTFB_e(S/N)\eta \quad (1)$$

The effective bandwidth of a crystal detector such as that shown at 34 in the embodiment of FIG. 3 may be a compromise between the microwave bandwidth and the video bandwidth as computed by the formula shown below:

$$B_e \approx \sqrt{2B_RB_V} \quad (2)$$

For a more detailed discussion and more accurate equations, reference is made of Harold Klipper's article on page 89 of the Microwave Journal published in August, 1965. If I is defined as the ratio of the sensitivities S1 and S2, S1 being the sensitivity of the present pulse detection radars and S2 being the sensitivity of the improved embodiment disclosed hereabove. Then, $$S1 = KTF\sqrt{2B_RB_V}(S/N), \text{ and} \quad (3)$$

$$S2 = KTF\eta B_S(S/N) \quad (4)$$

Therefore, $$I = S1/S2 = \sqrt{2B_RB_V}/\eta B_S \quad (5)$$

Some typically used figures may be $B_R = 3300$ MHz, $B_V = B_S = 10$ MHz, and for this ratio of Br/Bs, $\eta = 1.86$ (2.7 db). If all of these figures are substituted into the above equation, it turns out that an approximate improvement figure may be calculated as follows:

$$I = \sqrt{\frac{2 \cdot 3300 \cdot 10}{1.86 \cdot 10}} = 13.8, \quad (6)$$

or an 11 db improvement.

In some cases, it is desirable to have a very large channel bandwidth even beyond the present frequency operational capabilities of an individual S/N enhancer similar to the type disclosed in the aforementioned U.S. patent application Ser. No. 061,537, for example. For these instances, a circuit combining more than one signal-to-noise enhancer may be used.

Figure 6:
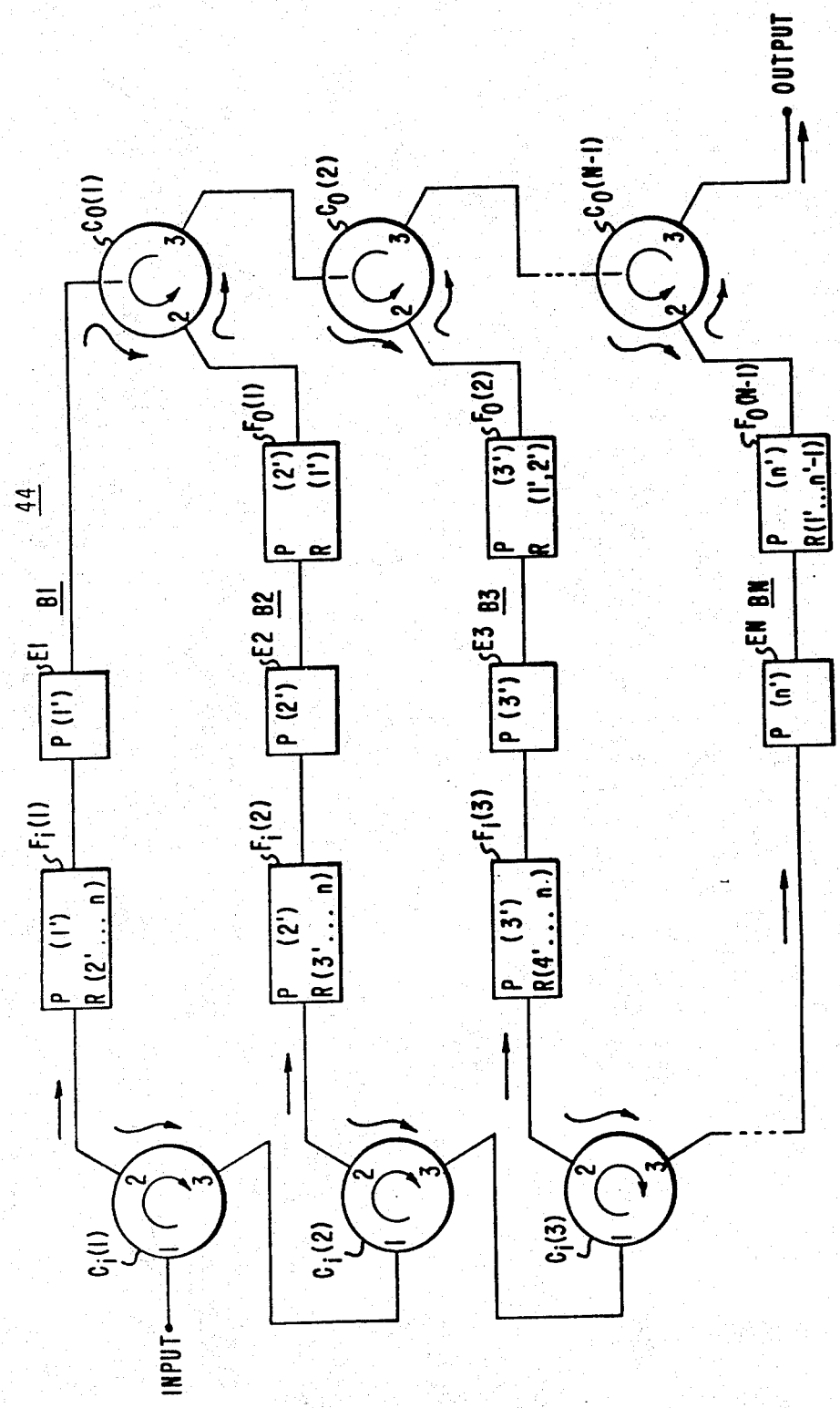
FIG. 6 is a block diagram schematic of an embodiment of a signal-to-noise enhancer circuit with a extended operational frequency bandwidth suitable for use in the embodiment of FIG. 3.

A typical embodiment for a S/N enhancer circuit suitable for use in expanding the operational bandwidth of a single enhancer 44 is depicted in FIG. 6. This exemplary embodiment includes a S/N enhancer E1, E2, E3, ..., EN disposed in each of a plurality of parallel network branches B1, B2, B3 ... BN, respectively. Likewise, a plurality of N−1 input microwave passband filters $F_i(1)$ through $F_i(N-1)$ may be disposed, respectively, in the first N−1 branches B1 through BN-1 of the enhancer network 44 and coupled to the inputs of their corresponding enhancers. Accordingly, a plurality of N−1 output microwave passband filters $F_O(1)$ through $F_O(N-1)$ may be disposed respectively in the branches B2 through BN and correspondingly coupled to the outputs of their respective enhancers. As described above, the purpose of the S/N enhancer circuit 44 is to increase the bandwidth of an individual S/N enhancer Ei. This is accomplished by separating the amplified signal or signal representative thereof into a plurality of signal portions in accordance with a corresponding selected sub-band or passband of frequency ranges which may be enumerated as 1', 2', 3', ... N' covering the overall range of the predetermined wide band detection channel. With regard to the exemplified embodiment of FIG. 6, the passband input and output filters $F_i$ and $F_O$, respectively, may be used for this signal portion separation process.

Additionally included in the enhancer circuit embodiment of FIG. 6 is a plurality of 3-port input microwave circuits, preferably circulators, denoted as $C_i(1)$ through $C_i(N-1)$ at the input of the parallel branches to direct the signals in a predetermined direction from one branch to another while affording protection against input microwave filter operational interactions. Also, a plurality of output circuits $C_O(1)$ through $C_O(N-1)$ may be disposed at the outputs of the microwave network branches for combining the enhanced output signals of the branches while affording protection against interaction between the output microwave filters. In so doing, the circuit $C_O(N-1)$ combines the signal portions which have passed through the corresponding branches and provides this combined signal to the output port of the enhancer circuit. The frequency subbands of the signal portions may be designed to cover the predetermined frequency bandwidth of each particular channel.

The S/N enhancers E1, E2, E3, ... EN which are disposed, respectively, in the network branches may be of the type which function by exciting magnetostatic waves in a ferrite material which may be configured as a film in one case and a plurality of spheres in another. Due to the excitation characteristics of the ferrite material of the S/N enhancers aforementioned, each may be adaptively operative with a selectivity bandwidth within the preselected sub-band of frequencies associated with the signal portion which has been separated to flow through the associated branch.

I claim:

1. A radar signal receiver including at least one pulse detection channel operative to process received radar signals having carrier frequencies within a predetermined broadband microwave channel frequency range to detect the presence of a radar pulse, each pulse detection channel comprising: an RF amplifier having an input and an output and operative to amplify received RF signals; means for detecting a radar pulse from the amplified RF signals of said RF amplifier and for generating a pulse detection signal in response to said detection; and an improvement of apparatus for increasing the sensitivity of detection of radar pulses especially in the presence of noise signals distributed within the corresponding broadband channel frequency detection range, said apparatus comprising:
a feedback signal path coupling the output to the input of said RF amplifier;
a signal-to-noise (S/N) enhancer circuit disposed in said feedback signal path and operative to adaptively focus a narrow enhancement bandwidth about the frequency of an input signal, which has a power level greater than a predetermined threshold level, for enhancing signals which have frequencies within said enhancement bandwidth and for attenuating signals which have frequencies outside of said enhancement bandwidth, said enhanced and attenuated signals being recirculated through said RF amplifier utilizing said feedback signal path; and
means, disposed in said feedback signal path, for inhibiting, at times, the recirculation of said signals through said feedback signal path as governed by said pulse detection signal.

2. The improvement in accordance with claim 1 wherein the feedback signal path includes a loop delay means in series with the signal-to-noise (S/N enhancer circuit to render a recirculation loop signal delay which is greater than the reciprocal of the narrow enhancement bandwidth of the S/N enhancer circuit.

3. The improvement in accordance with claim 1 wherein the detecting means includes:
means for extracting the video content from the amplified RF signals to generate a video signal having a value representative thereof;
means for applying a reference signal set at a value substantially close to but less than, the value of the generated video signal corresponding to RF amplifier saturation; and
another amplifier governed by said video and reference signals for generating a pulse detection signal when said video signal exceeds said reference signal in value.

4. The improvement in accordance with claim 1 wherein the S/N enhancer circuit comprises means for rendering an RF amplifier loop gain of greater than 0 db for the signals which have frequencies within said adaptively focused enhancement bandwidth and less than 0 db for the remaining signals of the channel bandwidth, whereby in the recirculation loop, an RF pulse signal which is substantially at one carrier frequency is amplified and the RF noise signals which are substantially broadband in nature are attenuated, thus after one or more recirculations, a weak RF pulse signal may become distinguishable from the broadband RF noise signals.

5. The improvement in accordance with claim 1 wherein the inhibiting means includes:
a logic circuit governed by the pulse detection signal to generate a control signal; and
a microwave switch disposed in the feedback signal path in series with the S/N enhancer circuit and governed by said control signal to squelch the recirculation of the signals.

6. The improvement in accordance with claim 1 wherein the feedback signal path further includes:
a first microwave coupler for coupling the output signals of the RF amplifier to the input of the signal-to-noise (S/N) enhancer circuit;
a delay means connected in series with the S/N enhancer circuit for rendering a recirculation loop signal delay;
a microwave switch connected in series with the S/N enhancer circuit for squelching the recirculation of the signals as governed by the pulse detection signal; and
a second microwave coupler for coupling the output signals of the S/N enhancer circuit to the input of the RF amplifier.

7. A radar signal receiver including at least one pulse detection channel operative to process received radar signals having carrier frequencies within a predetermined broadband microwave channel frequency range to detect the presence of a radar pulse, each pulse detection channel comprising: an RF amplifier having an input and an output and operative to amplify received RF signals; means for detecting a radar pulse from the amplified RF signals of said RF amplifier and for generating a pulse detection signal in response to said detection; and an improvement of apparatus for increasing the sensitivity of detection of radar pulses especially in the presence of noise signals distributed within the corresponding broadband channel frequency detection range, said apparatus comprising:
a feedback signal path coupling the output to the input of said RF amplifier;
a signal-to-noise (S/N) enhancer circuit disposed in said feedback path including:
means for separating the coupled output signal of said RF amplifier into signal portions corresponding to a plurality of preselected frequency bandwidths which cover the broadband microwave channel frequency range;
a S/N enhancer for each separated signal portion, each enhancer operative to adaptively focus a narrow enhancement bandwidth about the frequency of an input signal, which has a power level greater than a predetermined threshold level, for enhancing signals which have frequencies within said enhancement bandwidth and for attenuating signals outside of said enhancement bandwidth; and
means for combining the enhanced and attenuated signals of said plurality of signal portions to form a combined signal for recirculation through said RF amplifier; and means, disposed in said feedback path, for inhibiting, at times, the recirculation of said combined signal through said feedback path as governed by said pulse detection signal.

8. The improvement in accordance with claim 7 wherein the feedback signal path includes a loop delay means in series with the signal-to-noise (S/N) enhancer circuit to render a recirculation loop signal delay which is greater than the reciprocal of the narrow enhancement bandwidth of the S/N enhancer circuit.

9. The improvement in accordance with claim 7 wherein the inhibiting means includes:

a logic circuit governed by the pulse detection signal to generate a control signal; and a microwave switch disposed in the feedback signl path in series with the S/N enhancer circuit and governed by said control signal to squelch the recirculation of the signals

* * * * *